United States Patent [19]

Johnson

[11] Patent Number: 4,788,235

[45] Date of Patent: Nov. 29, 1988

[54] PHOSPHITE MODIFIED EPOXY RESIN

[75] Inventor: Michael A. Johnson, Lake Elmo, Minn.

[73] Assignee: Minnesota Mining and Manufacturing Company, St. Paul, Minn.

[21] Appl. No.: 123,794

[22] Filed: Nov. 23, 1987

[51] Int. Cl.$^4$ .................... C08K 5/52; C08L 63/00
[52] U.S. Cl. ........................... 523/451; 528/89; 528/92; 528/108; 528/374; 528/400
[58] Field of Search ............ 523/451; 528/89, 92, 528/108, 374, 400; 525/122

[56] References Cited

U.S. PATENT DOCUMENTS

| | | | |
|---|---|---|---|
| 3,352,947 | 11/1967 | Lew | 523/451 X |
| 3,553,298 | 1/1971 | Hodan et al. | 260/967 |
| 3,637,591 | 11/1972 | Coran | 260/47 |
| 3,703,496 | 11/1972 | Hodan et al. | 528/89 X |
| 4,080,353 | 3/1978 | Monte et al. | 260/40 |
| 4,111,909 | 9/1978 | Simons | 528/123 |
| 4,178,274 | 12/1979 | Denk et al. | 523/451 X |
| 4,223,071 | 9/1980 | Boyer et al. | 523/451 X |
| 4,223,115 | 9/1980 | Zalucha et al. | 525/455 |
| 4,261,913 | 4/1981 | Monte et al. | 260/429 |
| 4,417,009 | 11/1983 | Sugerman et al. | 523/451 |
| 4,476,285 | 10/1984 | Crabtree et al. | 525/113 |

*Primary Examiner*—Earl Nielsen
*Attorney, Agent, or Firm*—Donald M. Sell; David L. Weinstein

[57] ABSTRACT

Composition comprising an epoxy resin, an adduct of a tetra-substituted titanate and a di-substituted hydrogen phosphite, a neutral ester of a phosphorous acid, and a curing agent for the epoxy resin.

The composition is particularly useful as an adhesive for bonding structures made of sheet molding compound to like structures, to steel, and to other substrates commonly used in the automotive area.

13 Claims, No Drawings

PHOSPHITE MODIFIED EPOXY RESIN

BACKGROUND OF THE INVENTION

1. FIELD OF THE INVENTION

This invention relates to adhesives, and more particularly, epoxy adhesives.

2. DISCUSSION OF THE PRIOR ART

The automotive industry has used sheet molding compound (SMC) for manufacture of parts for automobile bodies. Sheet molding compound typically comprises specialty thermosetting polyester resins, reinforcing fibers, thickeners to increase the viscosity of the resin and to facilitate handling, catalysts to cure the resins, thermoplastic copolymers to reduce shrinkage during cure, filler to lower cost, improve the surface, or add specific properties, mold release agent, and pigment. In the manufacture of SMC, the polyester resin and low profile additives (shrink-reducing additives) are pre-blended with the catalyst, fillers, and pigment and thickening agent. This mixture (paste) is doctored onto a layer of polyethylene film, i.e. a release liner, which passes under a glass chopper where chopped glass fibers are introduced into the paste. Glass fiber length can be varied from approximately ½ inch up to any desired length depending upon end use requirements. In some cases continuous glass fibers are introduced with the chopped fiber for maximum reinforcing in critical areas. The glass fibers are then enveloped by another layer of paste and polyethylene film release liner. This web or sandwich is then compacted by a series of compaction rollers to ensure complete wet-out of the glass fiber reinforcement. The liner can then be removed and the resin impregnated material can be molded under heat and pressure into a desired shape.

Adhesives that have been used for the repair of parts made of SMC have been unsatisfactory. Adhesives for SMC must have the following properties:

1. Adhesion to SMC, steel, RIM urethane, RRIM urethane, RIM polyurea, reinforced nylon, and other automotive materials;
2. High temperature resistance;
3. Sufficient green strength to allow handling;
4. Environmental resistance.

It is also desired that the adhesive demonstrate minimum read-through and read-out. Read-through is surface distortion over a bonded area that can be measured with a profilometer. Read-out is surface distortion over a bonded area not readable with a profilometer, but visually identifiable, particularly after painting or exposure to high temperature.

A major problem with sheet molding compound involves achieving a class A paint finish that is identical to painted steel body panels. This problem results from read-through of the fiberglass reinforcement, which is unacceptable for cosmetic sheet molding compound applications.

Thermoplastic copolymers have been incorporated in sheet molding compound in an effort to improve the appearance painted SMC automobile components. The use of thermoplastic copolymers in SMC formulations has resulted in severe bonding problems for conventional repair adhesives. The problem arises from the difference in surface energies between the thermosetting polyester resin and the thermoplastic copolymer additive. This difference results in phase separation, and further results in preferential orientation of the thermoplastic material at the surface of the finished SMC part. At present, there are no after market adhesives suitable for repairing parts made of SMC.

U.S. Pat. No. 4,476,285 discloses an adhesive composition for repairing damaged graphite-epoxy composite structures, particularly those of aircraft, comprising a reaction product of a bisphenol A epoxy resin and a carboxyl terminated butadiene-acrylonitrile rubber, a curing agent consisting essentially of a cycloaliphatic diamine composed of bis (p-aminecyclohexyl)methane isomers, and a catalyst consisting essentially of triphenyl phosphine.

U.S. Pat. No. 4,223,115 discloses several classes of structural adhesive systems, each of which comprises a solution or dispersion of a polymeric material in a monomer copolymerizable therewith having incorporated therein certain phosphorous-containing compounds.

U.S. Pat. No. 3,637,591 discloses an epoxide resin composition suitable for curing wherein a neutral ester of a phosphorous acid is incorporated in a mixture of an epoxide resin and a curing agent free from a $BF_3$-organic base complex.

U.S. Pat. No. 4,080,353 discloses titanate-phosphite adducts which serve to reduce the viscosity of filled epoxy resins, thereby permitting higher filler loading, to enhance the tinctorial power of pigments, and to render casting resins water-extendible. However, the latter two patents do not indicate that the compositions disclosed therein would be useful as adhesives for SMC.

SUMMARY OF THE INVENTION

This invention provides a composition suitable for bonding articles made of SMC comprising an epoxy resin, an adduct of a tetra-substituted titanate and a di-substituted hydrogen phosphite, a neutral ester of a phosphorous acid, hereinafter referred to for convenience as a phosphite ester, and a curing agent for said epoxy resin. Phosphite esters that are preferred for the present invention are the di-substituted hydrogen phosphites and trisubstituted phosphites. Phosphite-titanite adducts that are preferred for the present invention are adducts of di-substituted hydrogen phosphites having the formula $(R'O)_2 P(O)H$ and tetra-substituted titanates having the formula $(R''O)_4 Ti$, where $R'$ and $R''$ represent monovalent alkyl, aryl, alkenyl, aralkyl or alkaryl groups, or alkoxy, aroxy, chloro or bromosubstituted derivatives thereof.

The composition of this invention can be used as an adhesive for bonding structures made of sheet molding compound to like structures, to steel, and to other automotive substrates. The presence of the titanate-phosphite adduct results in improved adhesion, high temperature resistance, green strength, and environmental resistance. Most importantly, the adduct results in viscosity reduction, thereby permitting increased filler loading.

DETAILED DESCRIPTION

The compositions of this invention contain an epoxy resin, a curing agent therefor, and both a phosphite ester and an adduct of a tetra-substituted titanate and a di-substituted hydrogen phosphite. These compositions can be used as adhesives for sheet molding compound.

Epoxy resins, or epoxide resins, as they are alternatively called, are well-known to those skilled in the art. Epoxy resins that are suitable for the present invention must contain at least one 1,2-epoxy group

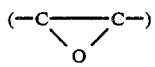

per molecule. These compounds may be saturated or unsaturated, aliphatic, cycloaliphatic, aromatic or heterocyclic and may contain substituents such as halogen atoms, OH groups, ether radicals and the like.

Generally, such epoxide resins comprise a polyether derivative of a polyhydric organic compound, preferably being selected from the group consisting of polyhydric alcohols and phenols containing at least two phenolic hydroxy groups.

Among the polyhydric phenols which may be used in preparing such epoxy resins are the mononuclear phenols such as resorcinol, catechol, hydroquinone, etc., and the polynuclear phenols, such as bis(4-hydroxyphenyl)-2,2-propane, also known as Bisphenol A, 4,4'-dihydroxybenzophenone, bis(4-hydroxyphenyl)-1,1-ethane, bis(4-hydroxyphenyl)-1,1-isobutane, bis(4-hydroxyphenyl)-2,2-butane, bis(4-hydroxy-2-methylphenyl)-2,2-propane, bis(4-hydroxy-2-tertiary butylphenyl)-2,2-propane, bis(4-hydroxy-2,5-dichlorophenyl)-2,2-propane, 4,4'-dihydroxybiphenyl, 4,4'-dihydroxypentachlorobisphenyl, bis(2-hydroxynaphthyl)-methane, 1,5-dihydroxy naphthalene, phloroglucinol, 1,4-dihydroxynapthalene, 1,4-bis(4-hydroxyphenyl) cyclohexane, etc. as well as other complex polyhydric phenols such as pyrogallol, phloroglucinol and novalac resins from the condensation of a phenol with an aldehyde in the presence of an acidic condensation catalyst.

In admixture with the named polynuclear phenols, use also may be made of those polynuclear phenols wherein the phenol nuclei are joined by sulfur bridges, as for example, in 4,4'-dihydroxydiphenyl sulfone.

Less preferably, there can be used 1,2-epoxy containing polyethers of aliphatic polyhydric alcohols, such as the polyglycidyl ethers thereof, as for example, the diglycidyl ethers of ethylene glycol, propylene glycol, trimethylene glycol, triethylene glycol, butylene glycol, diethylene glycol, 4,4'-dihydroxydicyclohexyl, glycerol, dipropylene glycol and the like, as well as ethers containing more than two glycidyl groups such as the glycidyl polyethers, glycerol, mannitol, sorbitol, polyallyl alcohol, polyvinyl alcohol and the like. Such glycidyl polyethers also have a 1,2-epoxy value greater than 1.0.

These epoxide resins, or glycidyl polyethers as they are frequently called, may be prepared by reacting predetermined amounts of at least one polyhydric compound and one epihalohydrin in an alkaline medium.

In the preparation of the epoxide resins, aqueous alkali is employed to combine with the halogen of the epihalohydrin. The amount of alkali employed should be substantially equivalent to the amount of halogen present and, preferably, should be employed in an amount somewhat in excess thereof. Aqueous mixtures of alkali metal hydroxides, such as potassium hydroxide and lithium hydroxide, may be employed; although for economic reasons, sodium hydroxide is obviously preferred.

The product of the above described reaction instead of being a single simple compound is generally a complex mixture of glycidyl polyethers, but the principal product may be represented by the formula wherein n is an integer of the series 0, 1, 2, 3 . . . , and R represents a divalent hydrocarbon radical of a polyhydric compound and preferably a dihydric phenol. The integer n has no specified upper limit. While for any single molecule n is an integer, the fact that the obtained polyether is a mixture of compounds causes the determined value for n, e.g., from molecular weight measurement, to be an average which is not necessarily a whole number.

The epoxides suitable for use in this invention have a 1,2-epoxy equivalency greater than 1.0. By epoxy equivalency, reference is made to the average number of 1,2-epoxy groups

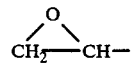

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form so that the epoxy equivalency of these compounds may be quite low and contain fractional values, and therefore the epoxy equivalency of the product is not necessarily an integer such as 2, 3, 4 and the like. The epoxide resin may, for example, have an equivalency of 1.5, 1.8, 2.5 and the like.

Epoxides are disclosed in various places in the art; amoung the references which may be mentioned are U.S. Pat. Nos. 2,324,483; 2,444,333; 2,494,295; 2,500,600; 2,503,726; 2,511,913; 2,518,056; 2,558,949; 2,579,698; 2,582,985; 2,592,560; 2,615,007; 2,615,008; and 2,633,458.

Many of the epoxide resins prepared by the above reaction are sold under trade names, as for example Epon resins by Shell Chemical Corporation or ERL resins by Union Carbide Corporation.

Commercially available epoxy resins that are suitable for the present invention include diglycidyl ether of Bisphenol A ("Epon" 828, Shell Chemical Corp.), cycloaliphatic epoxy ("ERL-4221", Union Carbide Corp.), novalac epoxy ("DEN-431", Dow Chemical Corp).

Additional information relating to epoxy or epoxide resins can be found in U.S. Pat. No. 3,637,591, incorporated herein by reference.

Phosphite esters that are suitable for the present invention include di-substituted hydrogen phosphites, and trisubstituted phosphites. Phosphite esters having the following structure:

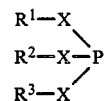

wherein X is a divalent chalcogen atom having an atomic weight of less than 35, i.e., oxygen or sulfur and $R^1$ and $R^2$ are like or unlike organic radicals, e.g., aromatic, aliphatic, alicyclic radicals and $R^3$ is hydrogen or an organic radical, represent a preferred class of phosphite esters for this invention. For example, the aromatic radicals may be aryl radicals such as phenyl, tolyl, ethylphenyl, nonylphenyl, decylphenyl, 2,4-dibutylphenyl, 2-methyl-3-ethylphenyl, cumyl, xenyl, naphthyl, and the like, or aralkyl radicals, the alkyl portion of such radicals being methyl, ethyl, isopropyl, butyl, isoamyl, hexyl, and the like; the aliphatic radicals may be alkyl radicals such as methyl, ethyl, isopropyl, butyl, isoamyl, hexyl, heptyl, 2-ethylhexyl, nonyl, isodecyl, dodecyl, and the like, or alkenyl radicals such as propynyl, butynyl, pentynyl and the like; the alicyclic radicals may be cycloalkyl radicals such as cyclopentyl, cyclohexyl, cycloheptyl, or cycloalkenyl radicals such as cyclopentenyl, cyclohexenyl, cycloheptenyl, and the like; etc.

The aforementioned radicals may also be substituted by one or more substituents. Typical, but not limitative of such substituents are the halogens, such as chlorine, bromine, iodine, and fluorine; alkoxy groups such as methoxy, ethoxy, propoxy, butoxy, ethoxybutoxy, etc.; one or more hydroxy groups, etc.

It is preferred that the divalent X radical in the above formula be an oxygen atom and that the $R^1$, $R^2$ and $R^3$ radicals each be an aryl hydrocarbon radical containing from 6 to 15 carbon atoms. Triphenyl phosphite is particularly preferred.

As exemplary of other classes of phosphite esters are the cyclic organic phosphites, such as those obtained by the reaction of an arylene dichlorophosphite with a glycol having adjacent hydroxyl groups, which compounds and the preparation thereof are more completely described in U.S. Pat. No. 2,839,563, the cyclic organic phosphites obtained by the reaction of a diol with a triaryl phosphite, which process is more completely described in U.S. Pat. No. 2,834,798, alkanolamine phosphites as are obtained by the partial transesterification of a tertiary aromatic phosphite, which process is more completely described in U.S. Pat. No. 2,841,607, tetra-aromatic alkylene phosphites obtained by the reaction of 2 mols of an appropriate secondary aromatic monochlorophosphite with a vicinal glycol in the presence of two mols of a tertiary base, as described in U.S. Pat. No. 2,841,606, and a pentaerythritol phosphite derivative as described in U.S. Pat. No. 2,847,443.

The phosphite esters contemplated for the composition of this invention can be obtained by the reaction of an appropriate hydroxy or thiol compound with phosphorous trihalide in the presence or absence of a hydrogen halide acceptor. It is preferred that the hydroxy compound, e.g., the aliphatic alcohol, aromatic alcohol, phenol or the thiol compound, e.g., aliphatic thioalcohol (mercaptan), aromatic thioalcohol (mercaptan), etc., have an acid dissociation constant (Ka) above about $1 \times 10^{-13}$, in that especially desirable results are obtained when the (R—X—) moiety of the phosphite ester is derived from a hydroxy or thiol compound which has an acid dissociation constant above this value. Additional information relating to phosphite esters can be found in U.S. Pat. No. 3,637,591, previously incorporated by reference.

Phosphite esters that are preferred for the present invention include triphenyl phosphite, di(tridecyl) phosphite. A commercially available phosphite ester that is suitable for the present invention is triphenyl phosphite ("Weston" TPP, Borg-Warner Chemicals, Inc.).

Phosphite-titanate adducts that are useful herein are adducts of di-substituted hydrogen phosphites having the formula $(R'O)_2P(O)H$ and tetra-substituted titanates having the formula $(R''O)_4Ti$. These adducts can be obtained by reacting one mole of the titanate compound with two moles of the phosphite compound. R' and the R" represent monovalent alkyl, aryl, alkenyl, aralkyl or alkaryl groups, or alkoxy, aroxy, chloro or bromosubstituted derivatives thereof. The alkoxy group as used herein includes polyoxyalkylene substitions. The R' and R" groups may be linear or branched, and may have from 1 to 4 substitutions. Broadly, R' may have from 1 to 18 carbon atoms and R" from 3 to 18 carbon atoms. Preferably, R" has from 6 to 14 carbon atoms. The preferred number of carbon atoms in the R' depends on the particular application. R' is preferably less than 6. The optimum number of carbon atoms for a given system may be readily determined by those skilled in the art. In a particular molecule, all of the R' or R" groups may be the same or different, so long as they fall within the above class.

Examples of phosphite-titanate adducts suitable for this invention include tetramethoxypropyl di(dioctylphosphito)titanate; tetraphenyl di(dibutylphosphito)titanate; dimethyl, diphenyl (di(diisopropylphosphito)titanate; tetramethoxyphenyl di(dibutylphosphito)titanate; tetramethyl di(diphenylphosphito)titanate; tetra(chloroethyl) di(octyldecylphosphito)titanate; tetra(chlorophenyl) di(dilaurylphosphito)titanate; tetra(bromomethyl) di(dimethoxybutylphosphito)titanate; tetraethyl di(dibenzylphosphito)titanate; tetraisobutyl di(ditolylphosphito)titanate; tetra t-butyl di(dixylylphosphito)titanate; tetra-z-methoxyethoxyethyl di(di-2-chloro-ditridecylphosphito)titanate; and methyl 2-hexyl 2-ethoxyethyl isooctyl di(2,4-dibromophenoxy n-hexylphosphito)titanate. Additional information relating to phosphite-titanate adducts can be found in U.S. Pat. No. 4,080,353 incorporated herein by reference.

A hardening of epoxide compositions of this invention may be accomplished by the addition of any of the chemical materials known in the art for curing epoxide resins. Such materials are usually referred to as curing agents but at times are designated as hardeners, activators or catalysts. While some curing agents promote curing by catalytic action, others participate directly in the reaction and are absorbed into the resin chain. Depending upon the particular agent used, the curing may be accomplished at room temperature, with heat produced by exothermic reaction or by the application of external heat.

Numerous examples of curing agents that may be used with the compositions of this invention and which are known to those skilled in the art for curing epoxide resins are listed in U.S. Pat. No. 3,637,591, previously incorporated by reference, in column 6, lines 4–66 thereof. Among these curing agents are various amines such as aliphatic and aromatic primary, secondary and tertiary amines, polyamines, hydroxy-alkylated polyamines, phenolic tertiary amines, salts of phenolic tertiary amines, aliphatic amine-adducts, cyanamide and its polymerization products, alcoholates of polyvalent metals, amide type curing agents, polyamides, organic and inorganic acids and anhydrides, and metal containing organic and inorganic compounds.

The polyamine curing agents and the polycarboxylic acid anhydride curing agents are especially useful in the epoxide compositions of this invention.

A sufficient amount of phosphite ester should be incorporated into the composition so that the ester, if it were present by itself, would bring about reduction of viscosity of the epoxy resin. The phosphite ester can be incorporated into the epoxy resin adhesive composition at a concentration of from about 1 percent by weight to about 100 percent by weight, based on weight of epoxy resin. The preferred concentration of phosphite ester ranges from about 10 percent by weight to about 25 percent by weight, based on weight of epoxy resin.

A sufficient amount of adduct of tetra-substituted titanates and di-substituted hydrogen phosphites should be incorporated into the composition so that the adduct, if it were present by itself, would bring about reduction of viscosity of the epoxy resin. The adduct of tetra-substituted titanates and di-substituted hydrogen phosphites can be incorporated into the epoxy resin adhesive composition at a concentration of from about 0.1 percent by weight to about 10 percent by weight, preferably from about 2 percent by weight to about 5 percent by weight, based on weight of epoxy resin.

Effective concentration of curing agents in the epoxy resin compositions of this invention vary in wide ranges depending on the particular epoxide and curing agent selected and the desired rate of cure. For the catalytic type curing agents the amount employed will usually vary from about 1 to about 20 parts per 100 parts by weight of the epoxide and more preferably from 1 part to 5 parts per 100 parts of the epoxide. It is generally suitable to use up to about 50 parts per 100 parts of epoxide of a polycarboxylic acid or anhydride, while in the case of an amine or amide type, from about 5 to about 20 parts per 100 parts by weight of epoxide are generally used. With the cross-linking amines, the customary method is to allow one epoxy group for each active hydrogen of the amine curing agent. Since the phosphorus containing modifier of this invention acts as a partial replacement for the amine curing agent, it is preferred to use less than a stoichiometric amount.

Various other ingredients may be mixed with the compositions of the present invention, including pigments, colors, fillers, resin stabilizers, flexibilizing modifiers and the like.

Incorporating both phosphite esters and adducts of tetra-substituted titanates and di-substituted hydrogen phosphites into the epoxy resin adhesive composition provides multiple advantages. Incorporation of both additives improves the bond strength of epoxy resin adhesive composition to automotive sheet molding compound. The surface tension of epoxy resin adhesive compositions is markedly decreased, thus increasing their wettability with respect to an automotive grade of sheet molding compound. The machinability of the cured epoxy resin adhesive composition is markedly improved, without increasing viscosity of the uncured resin system. As used herein, "machinability" means the ability of a material to be fabricated into predetermined shapes with abrading tools such as grinding wheels, coated abrasives, and rasps.

In the examples that follow, adhesive compositions of this invention were evaluated with respect to four criteria.

One criterion of adhesive performance is the ability of an adhesive composition to adequately contact an adherend, at the molecular level. This ability is usually stated in terms of an adhesive's affinity for a given substrate. Measurements were made by taking a droplet of the liquid, placing it on the desired substrate, and measuring the tangential angle at the liquid-solid interface. This angle is known as the contact angle. Measurements are expressed in degrees, and the greater the contact angle, the poorer the wetting. Conversely, the smaller the contact angle, the better the wetting.

Another criterion of adhesive performance is bond strength. A wedge test was used to determine the bond strength of each adhesive composition. The test used is described in "Evaluating SMC Bonds Using a Wedge Test", by Surrenda K. Joneja and Golam M. Wewaz, Adhesives Age, October 1985, pp. 18–22. The wedge test is reported in fiber (%) units, where fiber (%) is a qualitative assessment of the degree of fiber tear achieved upon completion of the test. This property is determined by visual inspection of the severed bond line and represents an important failure mode which, when maximized, insures that the bond strength is stronger than the cohesive strength of the substrate. High damage propagation energy as evaluated from the wedge test corresponds to extensive fiber tear in the substrate which indicates superior bonding. Good adhesive bonding manifests as high damage propagation energy.

Another criterion of adhesive performance is ability of the adhesive formulation to dissipate energy. Most epoxy compositions incorporate a rubber phase within a glassy adhesive matrix to impart toughness. The rubber phase acts to relieve any internal stress placed on the adhesive through a process known as crazing. Energy required to initiate damage and energy required to propagate damage are expressed in inch pounds and the latter value is equivalent to the area under a load versus deflection curve. Peak load is the maximum load value achieved during the test.

Machinability, another criterion of adhesive performance, was measured by means of a Schiefer tester with a 10 pound load and 500 cycles. The results are reported as amount of material removed from the test specimen. As the amount of material removed increases, the better is the machinability.

The following, non-limiting examples further illustrate the present invention.

EXAMPLE 1

This example demonstrates the effect provided by the phosphite ester and the adduct of tetra-substituted titanates and di-substituted hydrogen phosphites when combined in the appropriate ratio in an epoxy resin adhesive composition.

The following composition was used as a control.

| Ingredient | Amount (g) |
|---|---|
| Part A | |
| Amine terminated butadiene acrylonitrile copolymer ("Hycar ATBN" 1300 × 16, The B. F. Goodrich Co.) | 7.5 |
| Isolated amine adduct ("Versamine" I-70, Henkel Corp.) | 1.8 |
| Mercaptan-terminated liquid polymer ("Capcure" 3-800, Diamond Shamrock Chemicals) | 22.9 |
| 2,4,6-Tri(dimethylaminomethyl) phenol ("Capcure" EH-30, Diamond Shamrock Chemicals) | 4.0 |
| Nickel antimony titanium yellow rutile ("Sicotan" Yellow L1012, BASF Corporation) | 0.2 |

| Ingredient | Amount (g) |
| --- | --- |
| Organic derivative of castor oil ("Thixatrol" ST, NL Industries) | 2.0 |
| Part B | |
| Diglycidyl ether of Bisphenol A ("Epon" 828, Shell Oil Co.) | 25.0 |
| Organic derivative of a montmorillonite clay ("Bentone" SD-2, NL Industries) | 1.3 |
| Phthalocyanine blue (Sunfast Blue, Sun Chemical Corp.) | 0.2 |
| Talc (hydrous magnesium silicate) ("Beaverwhite" 325, Cyprus Mineral Co.) | 25.4 |

TABLE I

| Sample no. | Phosphite (phr) | Titanate-phosphite adduct (phr) | Peel energy (in - lb) | Peak load (lb) | Fiber (%) |
| --- | --- | --- | --- | --- | --- |
| Control | 0 | 0 | 13 | 25 | 0 |
| 1 | 20 | 0 | 42 | 46 | 5-60 |
| 2 | 0 | 4 | 35 | 15 | 0-100 |
| 3 | 20 | 4 | 102 | 90 | 100* |

*All samples failed by substrate splitting without failure of the bond line.

The data in Table I show that addition of phosphite ester alone increases peel energy, peak load, and fiber tear. The addition of phosphite ester and titanate-phosphite adduct further increases peel energy, peak load and fiber tear.

EXAMPLE 2

This example demonstrates the effect of phosphite ester and titanate-phosphite adduct on the machinability of epoxy resin adhesive compositions.

| Ingredient | Amount (g) Sample no. 4 | Amount (g) Sample no. 5 |
| --- | --- | --- |
| Part A | | |
| Amine terminated butadiene acrylonitrile copolymer ("Hycar" ATBN 1300 × 16) | 11.5 | 11.5 |
| Isolated amine adduct ("Versamine" I-70) | 2.0 | 2.0 |
| Mercaptan-terminated liquid polymer ("Capcure" 3-800) | 19.9 | 19.9 |
| 2,4,6-Tri(dimethylaminomethyl) phenol ("Capcure" EH-30) | 1.8 | 2.2 |
| Organic derivative of castor oil ("Thixatrol" ST) | 0.8 | 1.0 |
| Part B | | |
| Diglycidyl ether of Bisphenol A ("Epon" 828) | 25.0 | 25.0 |
| Organic derivative of a montmorillonite clay ("Bentone" SD-2) | 0.8 | 1.0 |
| Titanium IV tetrakis [2,2-bis[(2-propenyloxy)methyl]-1-butanolato-0] adduct 2 moles bis(ditridecyl phosphito-0), dihydrogen ("Ken-React" KR-55, Kenrich Petrochemicals, Inc.) | 1.6 | 2.0 |
| Talc (hydrous magnesium silicate) ("Beaverwhite" 325) | 17.3 | 21.4 |
| Triphenyl phosphite ("Weston" TPP, Borg-Warner Chemicals, Inc.) | — | 15.0 |

TABLE II

| Sample no. | Amount removed (g)[1] Grade 80D "Stick-It RN"[2] | Amount removed (g)[1] Grade 180A "Tri-M-ite"[3] |
| --- | --- | --- |
| 4 | 5.342 | 0.976 |
| 5 | 7.862 | 1.260 |

[1]Schiefer tester, 10 lb. load, 500 cycles
[2]"Stick-It RN" is a trademark for a pressure-sensitive adhesive backed resin over glue bonded coated abrasive, available from Minnesota Mining and Manufacturing Company.
[3]"Tri-M-ite" is a trademark for silicon carbide coated abrasive, available from Minnesota Mining and Manufacturing Company.

The data in Table II show that by incorporation of triphenyl phosphite into an epoxy resin adhesive formulation, the machinability of the cured adhesive is markedly improved.

EXAMPLE 3

This example demonstrates the effect on the wetting characteristics of epoxy resin adhesive compositions upon introduction thereto of phosphite ester and titanate-phosphite adduct.

| Additive | Contact angle |
| --- | --- |
| Deionized water (control) | 66 |
| Epoxy resin ("ERL-4221") | 38 |
| Epoxy resin ("Epon" 828) | 48 |
| Triphenyl phosphite ("Weston" TPP) | 18 |
| Tetra(2,diallyloxymethyl-1 butoxy titanium di[di(tridecyl)] phosphite ("Ken-React" KR-55) | 7 |
| 16.6% triphenyl phosphite ("Weston" TPP) in epoxy resin ("ERL-4221") | 28 |
| 4.6% triphenyl phosphite ("Weston" TPP) in epoxy resin ("Epon" 828) | 39 |
| 16.6% triphenyl phosphite ("Weston" TPP) in epoxy resin ("Epon" 828) | 31 |
| 4.6% triphenyl phosphite ("Weston" TPP) and 4.6% tetra (2, diallyloxymethyl-1 butoxy titanium di[di(tridecyl)] phosphite ("Ken-React" KR-55), in epoxy resin ("Epon" 828) | 30 |

Phosphite having the "Weston" mark are commercially available from Borg-Warner Chemicals, Inc.; adducts having the "Ken React" mark are commercially available from Kenrich Petrochemicals, Inc.

From the foregoing table, it can be seen that the addition of the titanate-phosphite adduct or the addition of phosphite ester reduces the contact angle of the epoxy resin into which it is introduced.

EXAMPLE 4

This example demonstrates that compositions comprising an excess equivalent ratio of phosphite ester to titanate-phosphite adduct have lower viscosity than composition containing only phosphite ester, only titanate-phosphite adduct, or neither.

The filler volume concentration was held at a constant value of 25%. The filler was hydrous magnesium silicate. The phosphite titanium ester adduct was a two to one mole ratio adduct of di(tridecyl) phosphite and tetra (2, diallyl oxymethyl-1 butoxy) titanium. The phosphite was triphenyl phosphite. The epoxy resin was diglycidyl ether of Bisphenol A ("Epon" 828).

TABLE IV

| Sample no. | Amount of phosphite ester (phr) | Amount of titanate-phosphite adduct (phr) | Viscosity (cps) |
|---|---|---|---|
| Control | 0 | 0 | 1,000,000 |
| 6 | 10 | 0 | 520,000 |
| 7 | 0 | 10 | 415,000 |
| 8 | 5 | 5 | 290,000 |
| 9 | 50 | 0 | 198,000 |
| 10 | 50 | 0.2 | 156,000 |
| 11 | 50 | 1 | 145,000 |
| 12 | 50 | 2 | 111,000 |
| 13 | 0 | 50 | 89,800 |
| 14 | 50 | 4 | 54,000 |
| 15 | 50 | 10 | 15,000 |

From Table IV, the following observations can be made:

1. Addition of phosphite ester alone (10 phr) reduces the viscosity of an epoxy resin adhesive composition by about 48%.
2. Addition of titanate-phosphite adduct alone (10 phr) reduces the viscosity of an epoxy resin adhesive composition by about 58%.
3. Addition of phosphite ester and titanate-phosphite adduct together (5 phr of each, i.e. a total of 10 phr of additives) reduces the viscosity of an epoxy resin adhesive composition by about 71%. From the foregoing observation, it is clear that phosphite ester and titanate-phosphite adduct operate synergistically to reduce the viscosity of an epoxy resin adhesive composition, i.e. a mixture containing equal parts of adduct and ester provides greater viscosity reduction than either adduct or ester does alone, even when equivalent weight loadings are used.

Another set of observations can be made from Table IV:

1. Addition of 50 phr of phosphite ester alone reduces the viscosity of an epoxy resin adhesive composition by about 80%.
2. Addition of 50 phr of titanate-phosphite adduct reduces the viscosity of the epoxy resin adhesive composition by about 91%. While these viscosity reductions are impressive, an extremely high concentration of ester or adduct was utilized (50 phr). A reasonably impressive level of viscosity reduction can be attained with much lower concentration of additives when the ester and adduct are used in combination (5 phr ester plus 5 phr adduct). Accordingly, the cost of the adhesive composition can be reduced as a result of lower consumption, and, consequently, lower total cost of ester or adduct additive.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. Composition comprising an epoxy resin, a phosphite ester, an adduct of a tetra-substituted titanate and a di-substituted hydrogen phosphite, and a curing agent for said epoxy resin, provided that said phosphite ester is present in an amount sufficient, if it were present by itself, to bring about reduction of viscosity of the epoxy resin, further provided that said adduct is present in an amount sufficient, if it were present by itself, to bring about reduction of viscosity of the epoxy resin.
2. The composition of claim 1 wherein said phosphite ester has the structure

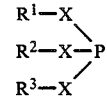

wherein X is a divalent chalkogen atom having an atomic weight of less than 35, $R^1$ and $R^2$ are like or unlike organic radicals, $R^3$ is hydrogen or an organic radical.

3. The composition of claim 1 wherein said phosphite ester is selected from the group consisting of di-substituted hydrogen phosphites and trisubstituted phosphites.
4. The composition of claim 3 wherein said phosphite ester is triphenyl phosphite.
5. The composition of claim 3 wherein said phosphite ester is di(tridecyl) phosphite.
6. The composition of claim 1 wherein about 0.01 to about 300 parts phosphite ester is used per 100 parts epoxy resin.
7. The composition of claim 1 wherein said adduct is an adduct of di-substituted hydrogen phosphite having the formula $(R'O)_2 P(O)H$ and tetra-substituted titanate having the formula $(R''O)_4 Ti$, where $R'$ and $R''$ represent monovalent alkyl, aryl, alkenyl, aralkyl or alkaryl groups, or alkoxy, aroxy, chloro or bromosubstituted derivatives thereof.
8. The composition of claim 1 wherein said adduct is prepared by reacting one mole of titanate with two moles of phosphite.
9. The composition of claim 1 wherein about 0.01 to about 50 parts adduct is used per 100 parts epoxy resin.
10. The composition of claim 1 wherein about 0.01 to about 300 parts phosphite ester and about 0.01 to about 50 parts adduct is used per 100 parts epoxy resin.
11. The composition of claim 1 wherein said curing agent is selected from the group consisting of amines, polyamines, and mercaptans.
12. The composition of claim 1 wherein said curing agent is an amine-terminated butadiene acrylonitrile copolymer.
13. An article made of sheet molding compound bearing an adhesive thereon obtained by curing the composition of claim 1.

* * * * *